(No Model.) 2 Sheets—Sheet 1.
W. MATHER.
SELF CLEANING FILTER.
No. 415,648. Patented Nov. 19, 1889.
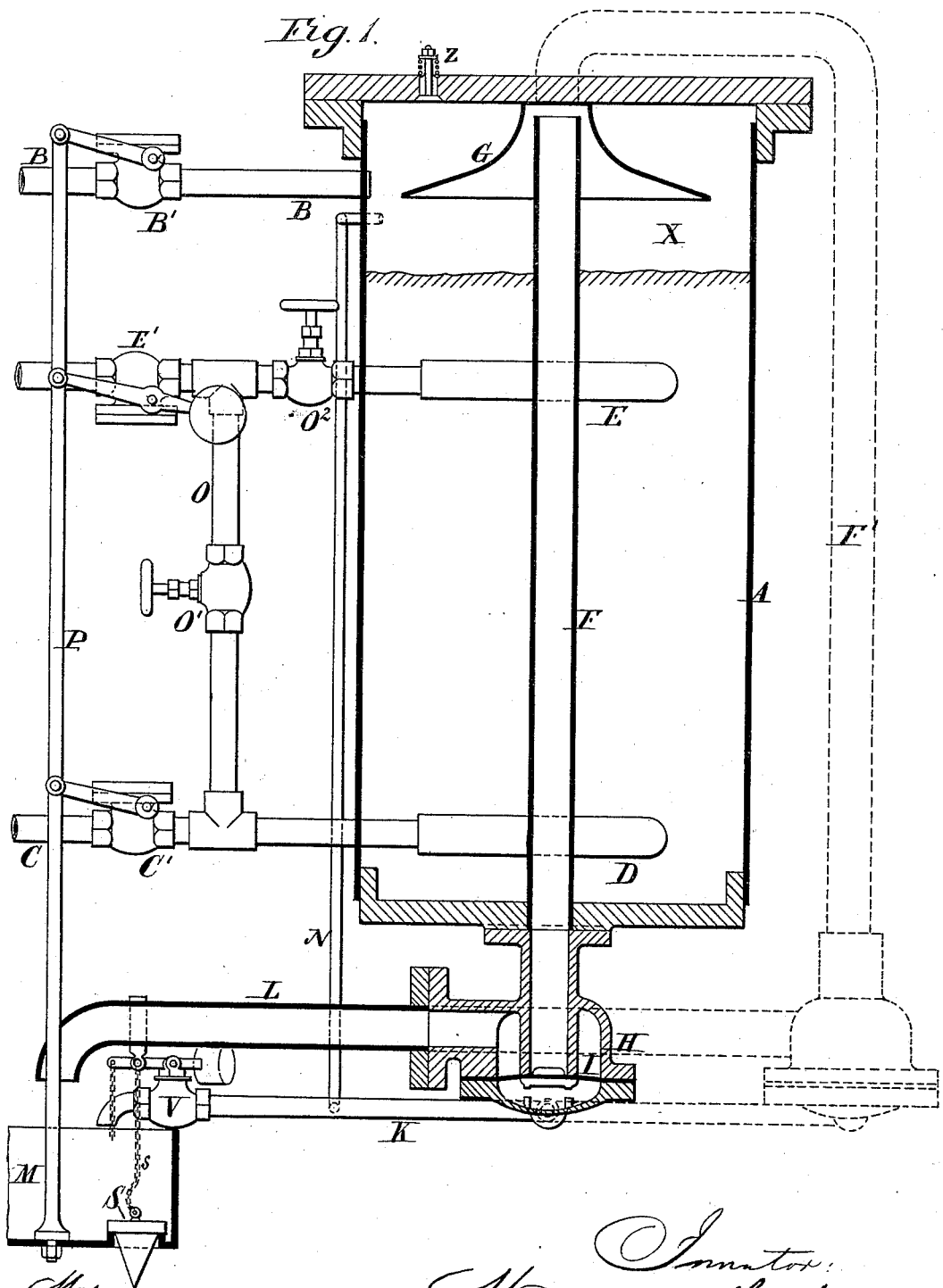

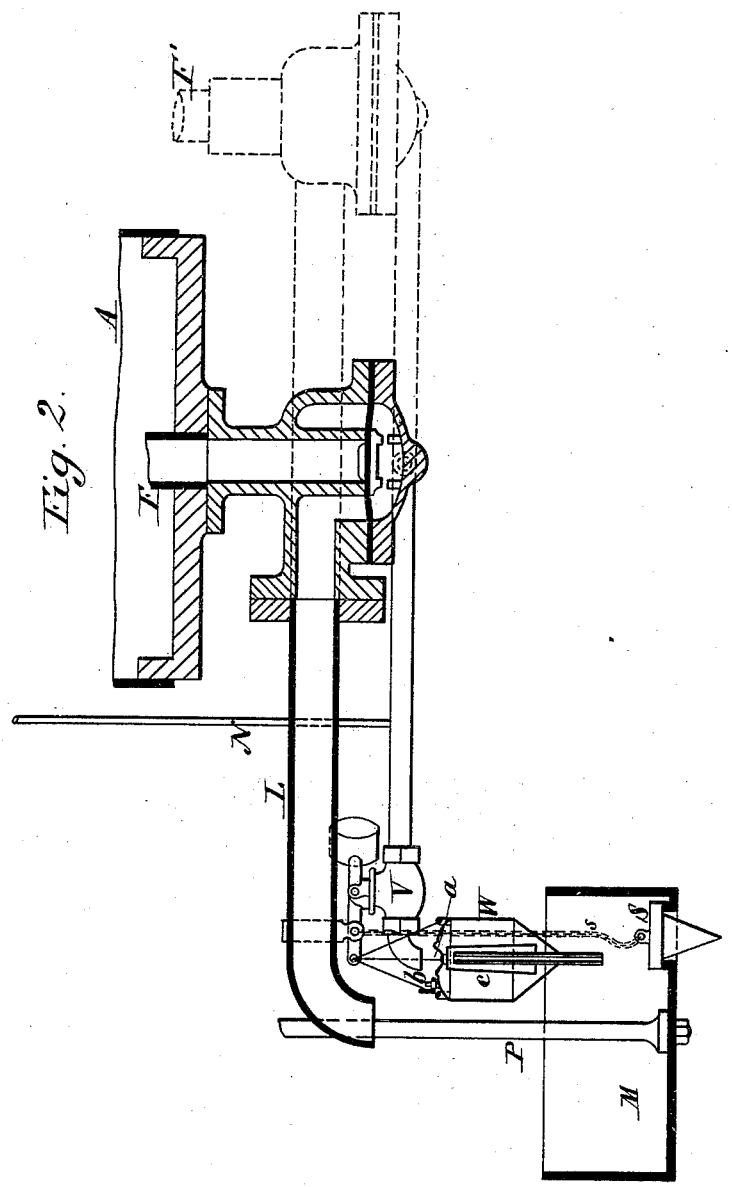

UNITED STATES PATENT OFFICE.

WILLIAM MATHER, OF SALFORD IRON WORKS, MANCHESTER, COUNTY OF LANCASTER, ENGLAND.

SELF-CLEANING FILTER.

SPECIFICATION forming part of Letters Patent No. 415,648, dated November 19, 1889.

Application filed July 3, 1889. Serial No. 316,416. (No model.)

*To all whom it may concern:*

Be it known that I, WILLIAM MATHER, a citizen of England, residing at Salford Iron Works, Manchester, in the county of Lancaster, England, have invented a certain new and useful Self-Cleansing Filter, of which the following is a specification.

When filters are employed for treating foul waters, the interstices of the filtering material are apt to become choked, or the surface may become covered by deposit of impurities, so that after a time the flow of the liquid becomes greatly impeded, or it may be stopped altogether. In order to provide against this, filters have been arranged with communications such that the direction of flow of the liquid can for a time be reversed, so as to wash out the deposited impurities from the interstices of the filtering material, and so to put it in condition for operating afresh.

My invention relates to means of rendering this reversal of flow automatic, and so dispensing with attendance for that purpose, the filter and its communications being so arranged that when the filter becomes so far choked as to impede flow through it the flow is for a time automatically reversed, and the filter thus scoured out is then re-established in condition for direct flow through it.

Figure 1 of the accompanying drawings is a vertical section, partly in elevation, of a self-cleansing filter according to my invention. Fig. 2 is a section of the lower part, showing an appliance for regulating the time during which the cleansing operation is carried on.

A is the casing or vessel of the filter, which is closed at the top and the bottom, so that it works under such pressure as is due to the column of supply. It is charged to a certain height with suitable filtering material, leaving a space X between the surface of the material and the top cover.

B is the pipe supplying water to be filtered, and C is the pipe for discharging the filtered water, this pipe communicating with perforated pipes D within the filter. At some distance below the surface of the filtering material there is a set of perforated pipes E, communicating with a supply of cleansing-water. A pipe F open at the top extends up the center of the filter nearly to the top, its upper part being situated within a conoidal deflecting-hood G. At the lower end of the pipe F is a valve-casing H, containing a flexible diaphragm I, arranged to close or open the mouth of the pipe F, according as the pressure under the diaphragm is greater or less than the pressure in the pipe F itself. The space under the diaphragm I communicates by a pipe K with a loaded relief-valve V, whence there is a discharge into a cistern M, and the pipe K communicates by a small pipe N with the upper part of the filter. From the valve-casing H, above the diaphragm I, a pipe L leads to the cistern M. This cistern M is suspended by a rod P, to which are linked the levers of valves B' E' C', governing the pipes B E C, respectively, one or all of these levers being weighted, so as to overbalance the cistern M when it is empty, but to allow it to descend when it is filled with water.

O is a pipe provided with a cock or valve O' for connecting, when desired, the pipes E and C.

At the bottom of the cistern M there is a plug-valve S, suspended from a fixed point by a chain s, which is slack when the cistern M is in its highest position, as shown, but which when the cistern M descends becomes tightened, so as to unseat the valve S. The valves B' and C' being open and E' and O' closed, water fills the space X, and the pressure of the water therein communicated by the pipes N and K to the under side of the diaphragm I keeps up the diaphragm, closing the pipe F. The water passing through the filtering material is discharged by the pipes D and C.

When, owing to the choking of the filter, the pressure in X increases so far as to open the loaded relief-valve V, there is a rush of water from the pipe K into the cistern M, causing it to descend, closing the valves B' and C' and opening E'; also, as the pipe N is small as compared with K the pressure under the diaphragm I is reduced, so that it descends, opening the pipe F. Water now entering by the pipes E washes upward the dirt lodged in the interstices of the filtering material above the pipes E, and by the siphon action of the pipe F and the hood G the water with suspended dirt is carried rapidly off and discharged into the cistern M, which is thus kept down, notwithstanding that the plug-valve S is held open. When this flow has continued so far that the liquid in X comes below the level of the lower edge of the hood G, air entering the space X through an air-valve Z, the siphon action of the pipe F ceases, the cistern M becomes emptied and reascends, closing the valve E' and opening B' and C', thus re-establishing the regular action of the filter.

Sometimes it is desirable to scour out the filter to a lower level than that of the pipes E. For that purpose the valve O' is opened and $O^2$ is closed, allowing the scouring-water to pass through the pipes D into the filtering material. The lever of the relief-valve V is preferably connected by a chain to the cistern M, so that when the cistern M descends the relief-valve becomes fully opened. The pipe F, instead of being carried down within the filter, may be carried down outside, as indicated by the dotted lines F'.

Although I have shown in the drawings my invention applied to a filter closed at the top and adapted for working under pressure, the same apparatus is applicable to an open-topped filter, the upper part X being made so much higher as may be necessary to communicate by the pipe N pressure sufficient to open the relief-valve V when the choking of the filtering material causes the column in the space X to rise a certain height above the normal level which it occupies when there is comparatively free passage through the filter.

The time during which the scouring action is carried on should be greater or less according to the nature and amount of the impurities deposited in the filtering material. This time may be regulated by the appliance shown in Fig. 2. From the lever of the valve V is suspended a vessel W, presenting a cup $a$, with openings immediately under the discharge from the valve. The apertures of the cup $a$ may be made greater or less in area according as it is required to fill the vessel W more or less rapidly, or the vessel may be provided with an air-cock $b$, which can be opened more or less for the same purpose. Within the vessel W is a siphon $c$, by which the water is rapidly discharged from the vessel when it has reached sufficiently high in it to start the siphon. When the valve V is opened by the increase of pressure in the upper part of the filter, a portion of the water discharged by the valve enters the vessel W, and this additional load, even when it is small, overcomes the counter-weight on the valve-lever, causing the valve V to open fully, thus reducing the pressure under the diaphragm I and bringing the scouring action into operation, as above described. This action continues until the vessel W is so far filled as to start the action of the siphon $c$. When this takes place, the vessel W is rapidly emptied by the siphon, and the valve V is then closed, causing the diaphragm I to rise, so as to stop the scouring-discharge and to restore all the parts to the condition for filtering.

Having thus described the nature of my invention and the best means I know for carrying the same into practical effect, I claim—

1. The combination, with a filtering-vessel having an upper supply-pipe, a lower discharge-pipe, and an intermediate scouring-pipe, of a valve to each of said pipes, a suspended rod linked to all of said valves, a cistern having a valve and carried by the suspended rod, a hood and a pipe having a diaphragm-valve and arranged as a siphon-discharge from the upper part of the filtering-vessel, and an adjustable relief-valve subject to the pressure in the upper part of the filtering-vessel and discharging into the valved cistern, substantially as described.

2. The combination, with a filtering-vessel having an upper supply-pipe, a lower discharge-pipe, and an intermediate scouring-pipe, of a valve to each of said pipes, a suspended rod linked to all of said valves, a cistern having a valve and carried by the suspended rod, a hood and a pipe having a diaphragm-valve and arranged as a siphon-discharge from the upper part of the filtering-vessel, an adjustable relief-valve discharging into the valved cistern and subject to the pressure in the upper part of the filtering-vessel, and a vessel arranged to receive an adjustable supply from the relief-valve and having a siphon-discharge, substantially as described.

In testimony whereof I have signed my name to this specification, in the presence of two subscribing witnesses, this 20th day of June, A. D. 1889.

W. MATHER.

Witnesses:
 OLIVER IMRAY,
 JNO. P. M. MILLARD,
*Both of 28 Southampton Buildings, London, W. C.*